3,159,691
CIS-POLYBUTADIENE COMPOSITIONS
Gerard Kraus, Bartlesville, Okla., assignor to Phillips Petroleum Company, a corporation of Delaware
No Drawing. Filed Dec. 5, 1960, Ser. No. 73,506
3 Claims. (Cl. 260—894)

This invention relates to blends of polybutadienes which contain a high percentage of cis 1,4-addition. In one aspect, the invention relates to cis-polybutadiene compositions which have high tensile strengths, high crystallization rates and satisfactory processing characteristics.

There has been a great deal of activity in recent years in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has also aroused considerable interest. The polymers formed by the use of these catalysts often have outstanding physical properties which render them equal to or even superior to natural rubber. A particularly outstanding product obtained by the use of certain stereospecific catalysts is a polybutadiene containing at least 85 percent cis 1,4-addition. The present invention is concerned with blends of polybutadienes which contain a high percentage of cis 1,4-addition.

It is an object of this invention to provide cis-polybutadiene compositions which have high tensile strengths, high crystallization rates and satisfactory processing characteristics.

Other and further objects and advantages of the invention will become apparent to those skilled in the art upon consideration of the accompanying disclosure.

Various methods are described in the literature for polymerizing 1,3-butadiene, including emulsion polybutadiene, alkali metal-catalyzed polymerization, and alfin-catalyzed polymerization. Products obtained by these methods contain varying amounts of cis 1,4-addition, trans 1,4-addition and 1,2-addition. However, it was not possible by any of these prior art methods to prepare a polybutadiene which contained more than about 35 percent cis 1,4-addition. As disclosed in copending U.S. patent application, Serial No. 578,166, filed by R. P. Zelinski and D. R. Smith on April 16, 1956, it has now been discovered that a polybutadiene containing at least 85 percent cis 1,4-addition can be produced by polymerizing butadiene with a catalyst system comprising an organoaluminum compound and titanium tetraiodide. It was found to be critical that the polybutadiene contain at least 85 percent cis 1,4-addition, for otherwise the polymer did not possess the outstanding physical properties which distinguish it from the prior art polymers. It has also been found that as the cis-content of the polybutadiene increases above 85 percent, the polymer exhibits generally improved properties because of the tendency of the polymer to crystallize during stress. However, while polybutadienes having a cis-content above 96 percent exhibit improved properties over a polymer having a slightly lower cis-content, polymers having such very high cis-contents are often difficult to process. It is essential that a polymer be processable, for otherwise its use is seriously limited.

In accordance with the present invention, it has now been discovered that improved compositions are obtained if a minor amount of a very high cis-polybutadiene, e.g., 96 percent and higher, is blended with a major amount of a polybutadiene of lower cis-content, e.g., 85 to 96 percent, the polybutadiene used in a minor amount having a cis-content at least 2 percent greater than the polybutadiene used in a major amount. The resulting composition unexpectedly retains many of the outstanding properties of the very high cis-polybutadiene, having a higher tensile strength and high crystallization rate than that of the polybutadiene having the lower cis-content. It was also unexpected when it was discovered that the blends are superior in tensile strength and crystallization rate to polybutadienes whose cis-contents are the same as the average cis-contents of the blends. Furthermore, blends of the two types of polybutadienes process satisfactorily even when the very high cis polymer is of high molecular weight and is, therefore, very difficult to process. Broadly speaking, the rubbery composition of this invention comprises a major amount of a polybutadiene containing in the range of 85 to 96 percent cis 1,4-addition and a minor amount of a polybutadiene containing at least 96 percent cis 1,4-addition. It is to be understood that the cis-content of the polybutadiene used in minor amounts is greater than the cis-content of the polybutadiene used in major amounts. The amount of the lower cis-content polymer employed in the composition is generally in the range of 60 to 99 parts by weight per 100 parts of the total composition. The amount of the high cis-content polymer employed in the composition is usually in the range of 1 to 40 parts by weight, preferably 5 to 30 parts by weight per 100 parts of the total composition. As previously mentioned, the composition of this invention possesses the outstanding physical properties of the higher cis-content polybutadiene while still having the processing characteristics of the lower cis-content polybutadiene. It is to be understood that it is not intended to limit the invention to any particular theory as to why these unobvious and outstanding results are obtained. However, the portion of the higher cis-polybutadiene, which crystallizes at lower extensions, is believed to serve as seed or nuclei to hasten crystallization of the polymer having the lower cis-content when the latter polymer is under stress. The increased crystallization rate manifests itself in higher tensile strength.

The cis-polybutadienes employed in preparing the composition of this invention can be produced by any method known in the art. A method for preparing the lower cis-content polybutadiene, i.e., a polybutadiene having a cis-content in the range of 85 to 96 percent, is described in the aforementioned copending application of R. P. Zelinski and D. R. Smith. According to the process described in this application, 1,3-butadiene is polymerized in the presence of a catalyst composition comprising a trialkylaluminum and titanium tetraiodide. The polybutadiene produced by this method is one in which the rubbery polybutadiene is formed by cis 1,4-addition, trans 1,4-addition and 1,2-addition, at least 85 percent of the polymer being formed by cis 1,4-addition. The polymerization can be carried out at a temperature in the range of zero to 150° C., and it is usually preferred to employ a hydrocarbon diluent. Examples of other catalyst systems which can be used to produce a polybutadiene containing in the range of 85 to 96 percent cis 1,4-addition include a catalyst comprising an organoaluminum compound, titanium tetrachloride and titanium tetraiodide and a catalyst comprising an organoaluminum, titanium tetrachloride and iodine. The polybutadiene containing at least 96 percent, e.g., from 96 to 99 percent, cis 1,4-addition can be prepared by polymerizing 1,3-butadiene in the presence of a cobalt-type catalyst system. One method for preparing a high cis-content polybutadiene with a cobalt-type catalyst is described in the copending U.S. Patent application Serial No. 73,505, filed by R. P. Zelinski on December 5, 1960. In accordance with the method described in this application, a very high cis-polybutadiene is prepared by polymerizing 1,3-butadiene with a catalyst comprising an alkylaluminum dihalide and the reaction product of a cobaltous compound with ammonia or an amine. A preferred catalyst system comprises ethylaluminum dichloride and the reaction product of cobaltous chloride and pyridine. When utilizing this catalyst system to prepare a high cis-polybutadiene, a preferred procedure is to charge the cobaltous chloride and pyridine to a reactor containing a hydrocarbon diluent. Thereafter, the ethylaluminum dichloride and the 1,3-butadiene are charged to the reactor in that order. When utilizing this process to prepare high cis-content polybutadiene, the polymerization is preferably carried out at a low temperature, e.g., at a temperature of 20° F. and below. A very high cis-content polybutadiene can also be prepared in accordance with the above-described Zelinski and Smith process by conducting the polymerization at a very low temperature, e.g., at $-30°$ C.

The composition of this invention can be prepared in a variety of ways, but the preferred method for admixing the high cis-polymer with the lower cis-polymer is with mechanical mixers such as roll mills or Banbury mixers. After admixing the polymers in the desired ratio, the resulting blend can be compounded and vulcanized by well known rubber vulcanization recipes. The choice of the particular high cis-polybutadiene will depend somewhat upon the cis-content of the lower cis-polybutadiene. When the lower cis-polybutadiene has a cis-content in the range of 94 to 96 percent, the high cis-polybutadiene preferably has a cis-content which is at least 2 percent higher. In any event, the high cis-polybutadiene has a cis-content of at least 96 percent. It is also within the scope of the invention to blend solutions of the polymers. The polymer blend is then recovered by removing the solvent by any suitable method such as by steam stripping or by coagulation with an alcohol.

The compositions of this invention are of particular value in gum and lightly reinforced stocks where elongations are high enough to allow stress crystallization to occur. Vulcanization accelerators, vulcanizing agents, reinforcing agents, and fillers such as have been used in natural rubber can be used when compounding the compositions of this invention. The rubbery compositions produced in accordance with this invention have utility in applications where natural and synthetic rubbers are used. They can be used in the manufacture of automobile tires and other rubber articles, such as gaskets.

A more comprehensive understanding of the invention can be obtained by referring to the following illustrative examples, which are not intended, however, to be unduly limitative of the invention.

The microstructure of the polymers used in preparing the compositions were determined by infrared analysis. The procedure described in "Determination of Unsaturation Distribution in Polybutadienes by Infrared Spectrometry," Silas, Yates and Thornton, Anal. Chem., 31, 529 (1959) was used in determining the microstructure of certain of the polybutadiene products as noted hereinafter in appropriate footnotes to Tables I and IX. The procedure described below was used in determining the microstructure of the other polybutadienes.

Samples of the polymers were dissolved in carbon disulfide to form a solution having 25 grams of polymer per liter of solution. The infrared spectrum of each of the solutions (percent transmission) was then determined in a commercial infrared spectrometer. The percent of total unsaturation present as trans 1,4- was calculated according to the following equation and consistent units:

$$\epsilon = \frac{E}{tc}$$

where $\epsilon$ = extinction coefficient (liters-mols$^{-1}$-centimeters$^{-1}$); $E$ = extinction (log $I^0/I$); $t$ = path length (centimeters); and $c$ = concentration (mols double bond/liter). The extinction was determined at the 10.35 micron band, and the extinction coefficient was 146 (liters-mols$^{-1}$-centimeters$^{-1}$). The percent of the total unsaturation present as 1,2- (vinyl) was calculated according to the foregoing equation, using the 11.0 micron band. The extinction coefficient was 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

EXAMPLE I

A series of seventeen runs were carried out in which 1,3-butadiene was polymerized with a catalyst consisting of triisobutylaluminum, titanium tetrachloride and titanium tetraiodide. The products obtained were blended and then used in preparing the composition of this invention. The following is a typical recipe used in the runs:

*Recipe*

| | Parts by weight |
|---|---|
| 1,3-butadiene | 100 |
| Toluene | 800 |
| Triisobutylaluminum (TIBA) | 0.65 |
| Titanium tetraiodide (TiI$_4$) | 0.182 |
| Titanium tetrachloride (TiCl$_4$) | 0.063 |
| Polymerization temperature, ° F.: | |
|     Initiation | 30 |
|     Control | 40 |
| Time, hours | 7 |
| Conversion, percent | 85 |

The procedure followed in conducting the run was to charge the toluene first to the reactor which was cooled to the initiation temperature. The triisobutylaluminum was then added followed by the titanium tetrachloride and the titanium tetraiodide which had been previously mixed. The butadiene was then charged in 4 increments at 15 minute intervals. The polymerization temperature was maintained at about 40° F.

The polymerization was effected in an atmosphere of nitrogen. The butadiene was dried by passing it through silica gel dryers. The toluene was passed through bauxite driers to remove the major portion of the water and drying was completed with a prepurified nitrogen stream passed counter-current to the toluene stream in a packed column. The triisobutylaluminum was charged as a 20 percent solution in toluene. The titanium tetrachloride-titanium tetraiodide mixture was prepared by adding 5 percent titanium tetrachloride in toluene to a 1 percent titanium tetraiodide dispersion in toluene at least 15 minutes prior to charging.

All runs were shortstopped with water, and either 0.5 or 1.0 weight percent of an antioxidant, based on rubber, was employed. Each polymer solution was given two cold water washes, using for each wash a volume of water slightly greater than the solution volume. The polymer solutions were blended, and the resulting solution blend was steam stripped. The rubbery product obtained was dried in an extrusion dryer, the temperature of which was adjusted to keep the extruded polymer temperature below 300° F. The polybutadiene had the properties shown below in Table I.

TABLE I

| | |
|---|---|
| Inherent viscosity [1] | 2.57 |
| Gel, percent [2] | 0 |
| Microstructure, percent [3] | |
|     Cis | 95.3 |
|     Trans | 1.6 |
|     Vinyl | 3.1 |

[1] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

[3] Determined by method of Silas, Yates and Thornton referred to above.

Two runs were made for the preparation of cis-polybutadiene having a higher cis-content than the foregoing polymer. The following recipe was used:

Recipe

| | Parts by weight |
|---|---|
| 1,3-butadiene | 100 |
| Cyclohexane | 1000 |
| Pyridine | 0.2 |
| Ethylaluminum dichloride | 1.27 |
| Cobaltous chloride ($CoCl_2$) | 0.13 |
| Temperature, ° F. | 14 |
| Time, hours | 24 |

The procedure followed in each run was to charge the cyclohexane initially to the reactor which was then purged with nitrogen. The cobaltous chloride, pyridine and ethylaluminum dichloride were then added in that order. The butadiene was charged last. The runs were conducted in an atmosphere of nitrogen.

The results of the runs are set forth below in Table II. The products of these runs are designated hereinafter as seed polymers 1 and 2.

TABLE II

| Run No. | Conversion, Percent | Inherent Viscosity [1] | Gel,[2] Percent | Microstructure, percent | | |
|---|---|---|---|---|---|---|
| | | | | cis | trans | Vinyl |
| 1 | 50 | 1.96 | 0 | 98.0 | 1.0 | 1.0 |
| 2 | 42 | 2.13 | 0 | 97.9 | 1.1 | 1.0 |

[1] See footnote 1 of Table I.
[2] See footnote 2 of Table I.

The 95.3 percent cis-polybutadiene was compounded alone and in admixture with each of the seed polymers. The following compounding recipe (gum stock) was employed:

Recipe

| | Parts by weight |
|---|---|
| Rubber | 100 |
| Stearic acid | 2 |
| Zinc oxide | 3 |
| Tuads [1] | 0.15 |
| Ethyl selenac [2] | 1.5 |

[1] Tetramethylthiuram disulfide.
[2] Selenium diethyldithiocarbamate.

Certain physical properties were determined after curing the stocks for 30 minutes at 307° F. The results of these determinations are shown below in Table III.

TABLE III

| | A | B | C |
|---|---|---|---|
| cis-Polybutadiene (95.3% cis) | 100 | 80 | 80 |
| Seed polymer 1 (98.0% cis) | | 20 | |
| Seed polymer 2 (97.9% cis) | | | 20 |
| $\nu \times 10^4$, moles/cc.[1] | 0.98 | 0.92 | 0.92 |
| 300% Modulus, p.s.i.[2] | 185 | 180 | 170 |
| Tensile, p.s.i.[2] | 1,335 | 1,735 | 1,540 |
| Elongation, percent [2] | 1,300 | 1,490 | 1,475 |
| Shore A hardness [3] | 48 | 42 | 41 |
| Heat Build-up, $\Delta T$, ° F.[4] | 28.3 | 32.4 | 31.0 |
| Resilience, percent [5] | 83.1 | 84.4 | 83.3 |

[1] Determined by the Swelling Method of Kraus, as described in Rubber World 1..5, 67–73, 254–260 (1956).
[2] ASTM D412-51T. Scott Tensile Machine L-6. Tests are made at 80° F. unless otherwise designated.
[3] ASTM D676-55T. Shore Durometer, Type A.
[4] ASTM D623-52T. Method A, Goodrich Flexometer, 143 lbs./sq. inch cylinder 0.7 inch in diameter and 1 inch high.
[5] ASTM D945-55 (modified). Yerzley oscillograph. Test specimen is a right circular cylinder 0.7 inch in diameter and 1 inch high.

These data show that an improvement in tensile strength was obtained by blending either of the seed polymers with the 95.3 percent cis polymer.

EXAMPLE II

The 95.3 percent cis-polybutadiene described in Example I and an 80/20 blend of this polymer with seed polymer 2 of Example I were compounded in the following gum stock recipe:

Recipe

| | Parts by weight |
|---|---|
| Rubber | 100 |
| Stearic acid | 2 |
| Red lead | 1.5 |
| Tuads | 0.15 |
| Ethyl Selenac | 1.5 |

The stocks were cured 30 minutes at 307° F. Certain physical properties were determined, and the results shown in Table IV were obtained:

TABLE IV

| | | |
|---|---|---|
| cis-Polybutadiene (95.3% cis) | 100 | 80 |
| Seed polymer 2 (97.9% cis) | | 20 |
| $\nu \times 10^4$, moles/cc. [1] | 1.09 | 1.08 |
| 300% Modulus, p.s.i.[2] | 200 | 220 |
| Tensile, p.s.i.[2] | 1,375 | 1,520 |
| Elongation, percent [2] | 1,120 | 1,245 |
| Heat Build-up, $\Delta T$, ° F.[3] | 28.3 | 26.0 |
| Resilience, percent [4] | 85.8 | 86.4 |

[1] See Footnote (1) of Table III.
[2] See Footnote (2) of Table III.
[3] See Footnote (4) of Table III.
[4] See Footnote (5) of Table III.

In these compositions, the stock were cured to substantially the same crosslinking level. It is seen that by blending the 95.3 percent cis-polybutadiene with a minor amount of a polybutadiene of higher cis-content a composition having an improved tensile strength was obtained.

EXAMPLE III

A polybutadiene rubber having a very high cis-content was prepared in the presence of an initiator comprising ethylaluminum dichloride and a cobaltous chloride-pyridine reaction product. One gram of anhydrous cobaltous chloride was added to 500 milliliters of toluene which had previously been purged with nitrogen. Dry pyridine (1.23 milliliters) was introduced, and the mixture was agitated for 30 minutes at room temperature. It was allowed to settle for one hour, and a portion of the soluble material was withdrawn for use in the polymerization. The reaction was effected in an atmosphere of nitrogen. The following polymerization recipe was employed:

Recipe

| | |
|---|---|
| 1,3-butadiene, parts by weight | 100 |
| Toluene, parts by weight | 1200 |
| Ethylaluminum dichloride, millimoles | 10 |
| $CoCl_2$ solution, milliliters | 5 |
| Temperature, °F. | 41 |
| Time, hours | 3 |
| Conversion, percent | 50 |
| Inherent viscosity [1] | 3.66 |
| Microstructure, percent | |
|    Cis | 97.9 |
|    Trans | 1.1 |
|    Vinyl | 1.0 |

[1] See footnote 1 of Table I.

The foregoing rubbery polybutadiene (97.9% cis) was blended in variable quantities with the 95.3% cis-polybutadiene used in the preceding examples. The blends, and also the 95.3% cis-polybutadiene alone, were compounded in the following carcass-type recipes:

Recipes

| | Parts by Weight | | | |
|---|---|---|---|---|
| | A | B | C | D |
| cis-Polybutadiene, (95.3% cis) | 100 | 90 | 80 | 80 |
| Seed polymer (97.9% cis) | | 10 | 20 | 20 |
| Philblack E [1] | 20 | 20 | 20 | 20 |
| Stearic acid | 2 | 2 | 2 | 2 |
| Zinc oxide | 3 | 3 | 3 | 3 |
| Tuads | 0.2 | 0.2 | 0.15 | 0.2 |
| Ethyl Selenac | 1.75 | 1.75 | 1.5 | 2.0 |
| Flexamine [2] | 1.0 | 1.0 | 1.0 | 1.0 |

[1] Super abrasion furnace black.
[2] Physical mixture containing 65 percent of a complex diarylamine-ketone reaction product and 35 percent of N,N'-diphenyl-p-phenylenediamine.

The compositions were cured 30 minutes at 307° F., and certain physical properties were determined. The results obtained are shown below in Table V.

TABLE V

| | A | B | C | D |
|---|---|---|---|---|
| $\nu \times 10^4$, moles/cc.[1] | 1.26 | 1.27 | 1.24 | 1.49 |
| 300% Modulus, p.s.i.[2] | 350 | 390 | 340 | 340 |
| Tensile, p.s.i.[2] | 2,430 | 2,665 | 2,650 | 2,640 |
| Elongation, percent [2] | 980 | 990 | 1,040 | 940 |
| Shore A hardness [3] | 53 | 54 | 52 | 55 |
| Heat-Build-up, $\Delta T$, °F.[4] | 34.1 | 34.1 | 37.1 | 31.0 |
| Resilience, percent [5] | 80.7 | 80.6 | 79.5 | 80.8 |

[1] See Footnote (1) of Table III.
[2] See Footnote (2) of Table III.
[3] See Footnote (3) of Table III.
[4] See Footnote (4) of Table III.
[5] See Footnote (5) of Table III.

The same compounding recipe was used in runs A and B, and the compositions were cured to the same level. The results show that the product prepared from the blend had a higher tensile strength than the product prepared from cis-polybutadiene alone. Comparison of product C with product A shows again that the presence of the high-cis polymer results in a vulcanizate having a higher tensile strength. Some adjustments were made in compounding recipe C in order to give a cure level comparable to A. The same quantity of 97.9 percent cis polymer was present in C and D. The results show that the effect of the high-cis polymer is independent of the cure level.

EXAMPLE IV

A series of runs were carried out in which a polybutadiene product containing 96.4 cis 1,4-addition was prepared. The recipe used in these runs was as follows:

Recipe

| | Parts by weight |
|---|---|
| 1,3-butadiene | 100 |
| Toluene | 1200 |
| Pyridine | 0.2 |
| Ethylaluminum dichloride | 0.64 |
| Cobaltous chloride | 0.13 |
| Temperature, °F. | 41 |
| Time, hours | 17 |

The procedure used in the runs was substantially as that used in the runs described in Example I in which a similar catalyst was employed. The products from the runs were blended, and certain properties of the blend are shown below in Table VI.

TABLE VI

| | |
|---|---|
| Inherent viscosity [1] | 1.92 |
| ML-4 at 212° F.[2] | 42 |
| Microstructure, percent | |
|    Cis | 96.4 |
|    Trans | 1.7 |
|    Vinyl | 1.9 |

[1] See foot note 1 of Table I.
[2] ASTM D927-55T.

The 95.3 percent cis-polybutadiene of Example I, an 80/20 blend of this polymer with a 98 percent cis-polybutadiene (seed polymer 1 of Example I), and the 96.4 percent cis-polybutadiene were compounded in accordance with the following recipe:

Recipe

| | Parts by weight |
|---|---|
| Rubber | 100 |
| Philblack I | 25 |
| Stearic acid | 2 |
| Zinc oxide | 3 |
| Tuads | 0.15 |
| Ethyl Selenac | 2.0 |

The stocks were cured for 30 minutes at 307° F. The results of the determination of physical properties are shown below in Table VII.

TABLE VII

| | A | B | C |
|---|---|---|---|
| cis-Polybutadiene (95.3% cis) | 100 | 80 | |
| Seed polymer (98% cis) | | 20 | |
| Cis-Polybutadiene (96.4% cis) | | | 100 |
| $\nu \times 10^4$, Moles/cc.[1] | 1.48 | 1.22 | 1.24 |
| 300% Modulus, p.s.i.[2] | 515 | 480 | 440 |
| Tensile, p.s.i.[2] | 2,715 | 3,365 | 1,950 |
| Elongation, percent [2] | 835 | 990 | 725 |
| Shore A hardness [3] | 61 | 56 | 59 |
| Heat Build-up, $\Delta T$, °F.[4] | 35.1 | 37.8 | 42.9 |
| Resilience, percent [5] | 80.3 | 78.7 | 76.8 |

[1] See Footnote (1) of Table III.
[2] See Footnote (2) of Table III.
[3] See Footnote (3) of Table III.
[4] See Footnote (4) of Table III.
[5] See Footnote (5) of Table III.

The results show that composition B, which contained the very high cis polymer, was superior in tensile strength to either composition A or C, the latter having a cis content slightly higher than that of the 80/20 blend. (95.8% average cis content).

EXAMPLE V

The 95.3 percent cis-polybutadiene described in Example I and an 80/20 blend of this polymer with the 97.9 percent cis-polybutadiene of Example III (seed polymer) were compounded in the following recipe:

*Recipe*

| | Parts by weight |
|---|---|
| Rubber | 100 |
| Philback I | 25 |
| Stearic acid | 2 |
| Zinc oxide | 3 |
| Flexamine | 1 |
| Tuads | 0.15 |
| Ethyl Selenac | 1.5 |

The stocks were cured for 30 minutes at 307° F., and certain physical properties were determined. The results of these determinations are shown below in Table VIII.

TABLE VIII

| | A | B |
|---|---|---|
| cis-Polybutadiene (95.3% cis) | 100 | 80 |
| Seed polymer (97.9% cis) | | 20 |
| $\nu \times 10^4$, mmoles/cc.[1] | 1.43 | 0.81 |
| 300% Modulus, p.s.i.[2] | 485 | 440 |
| Tensile, p.s.i.[2] | 2,950 | 3,345 |
| Elongation, percent[2] | 905 | 1,030 |
| Shore A hardness[3] | 58 | 56 |
| Heat Build-up, $\Delta T$, °F.[4] | 37.1 | 39.2 |
| Resilience, percent[5] | 78.7 | 78.4 |

[1] See Footnote (1) of Table III.
[2] See Footnote (2) of Table III.
[3] See Footnote (3) of Table III.
[4] See Footnote (4) of Table III.
[5] See Footnote (5) of Table III.

These data show that in spite of the great difference in cure levels the polymer blend has the higher tensile strength as in preceding examples.

EXAMPLE VI

The melting point and crystallization half-life were determination on a series of cis-polybutadienes. A dilatometer with a capillary tube of 0.044 square centimeter bore was used for the determinations and the change in height of the mercury column was followed with a cathetometer.

When determining crystallization half-life the polymer to be tested is put into the dilatometer bulb. It is then placed under a vacuum of about $10^{-5}$ microns at room temperature for approximately 6 hours and, while still under vacuum, it is heated to 95° C. for 30 minutes. This process removes air bubbles and also dsetroys any crystallinity in the rubber. The vacuum is discontinued, the heat source removed, the void space filled with mercury, and the dilatometer bulb placed in a —30° C. bath with the capillary tube being left at room temperature. The height of the mercury column decreases as the rubber crystallizes. Readings are taken on the cathetometer until no further change occurs.

For the melting point determination, the bulb which has been cooled to —30° C. is allowed to increase in temperature at the rate of 0.1° C. per minute. The height of the mercury column (readings taken on the cathetometer) is plotted against temperature. The point at which a sharp break in the curve occurs is taken as the melting point of the rubber.

The cis-content of the polymers, the melting point, and crystallization half-life are shown below in Table IX.

TABLE IX

| Run No. | Polybutadiene, cis content, percent | Melting Point, °C. | Crystallization Half-life at 30° C. |
|---|---|---|---|
| 1 | 94.3 | —7.5 | 21 |
| 2 | 97.7 | —0.8 | <4 |
| 3[1] | Blend: 94.3 (80%) 98.0 (20%)[2] | —5.4 | <4 |
| 4 | 95.3 | —6.9 | 20 |

[1] Average cis content of blend is 95.1%.
[2] Determined by method of Silas, Yates and Thornton referred to hereinbefore.

The blend (run 3) had the same crystallization rate as the high cis polymer in run 2. The polymer used in run 4 had about the same cis-content as the average cis-content of the blend, yet the blend had a much faster crystallization rate as well as a higher melting point. The data demonstrate clearly that a minor amount of very high cis-polybutadiene has a marked effect on crystallization rate.

As will be evident to those skilled in the art, many variations and modifications of this invention can be practiced in view of the foregoing disclosure. Such variations and modifications are believed to come within the spirit and scope of the invention.

I claim:

1. As a new composition of matter, a blend of 100 parts by weight of rubbers comprising (1) 70 to 95 parts by weight of a first polybutadiene containing in the range of 85 to 96 percent cis 1,4-addition and (2) 5 to 30 parts by weight of a second polybutadiene containing in the range of 96 to 99 percent cis 1,4-addition, said second polybutadiene having a cis-content at least 2 percent greater than that of said first polybutadiene.

2. As a new composition of matter, a blend of rubbers comprising 60 to 99 parts by weight of a first polybutadiene containing in the range of 85 to 96 percent cis 1,4-addition and 1 to 40 parts by weight of a second polybutadiene containing in the range of 96 to 99 percent cis 1,4-addition, said second polybutadiene having a cis-content at least 2 percent greater than that of said first polybutadiene, the aforesaid parts by weight ranges being based on 100 parts by weight of total rubbers contained in the blend.

3. The vulcanized product of claim 2.

References Cited in the file of this patent
UNITED STATES PATENTS 3,060,989    Railsback et al.    Oct. 30, 1962
3,066,126    Porter et al.    Nov. 27, 1962

OTHER REFERENCES

Kraus et al.: "The Rubber and Plastics Age," vol. 38, No. 10, pages 880–892, October 1957.